Dec. 18, 1923.                J. T. WELSH                1,478,311
                                TROLLEY
                          Filed July 19, 1922
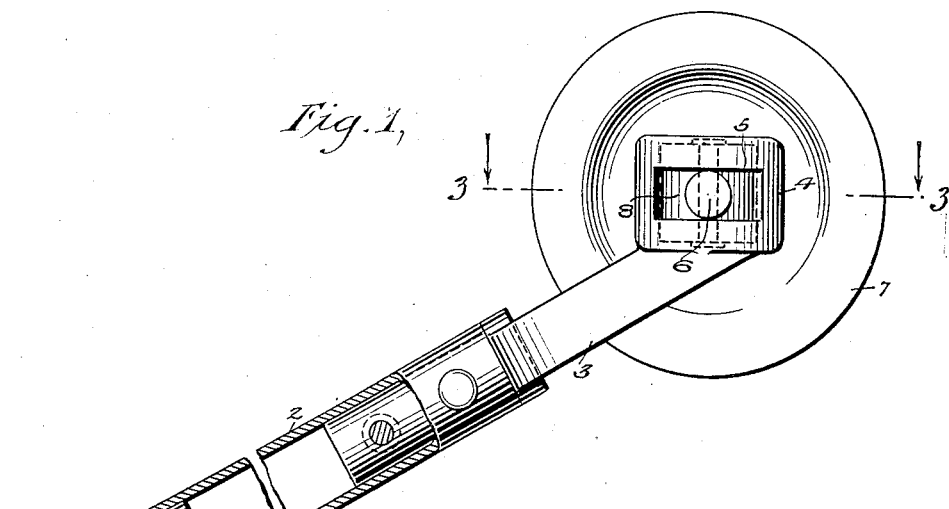
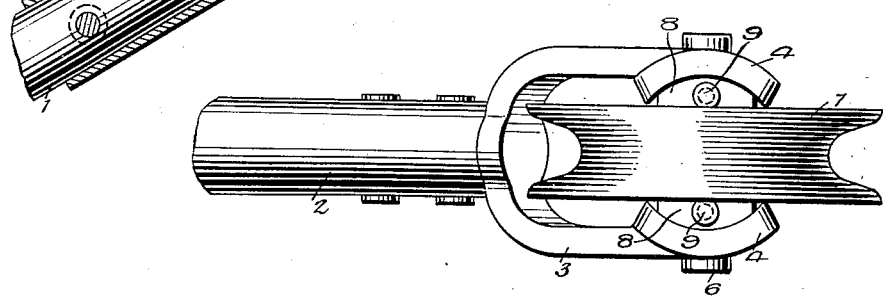
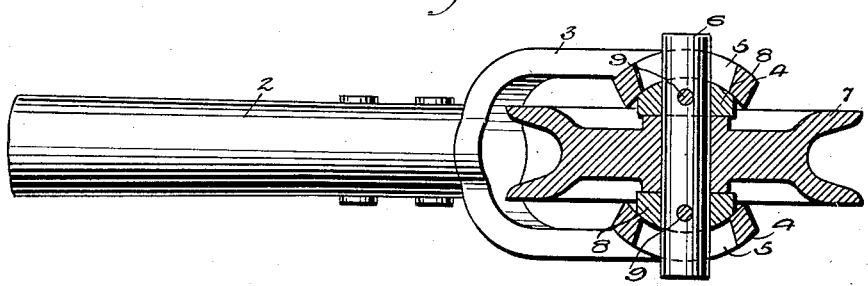
WITNESSES                                         INVENTOR
                                                  J. T. Welsh
                                              BY
                                                  ATTORNEYS Patented Dec. 18, 1923.

1,478,311

UNITED STATES PATENT OFFICE.

JOHN T. WELSH, OF SCHENECTADY, NEW YORK.

TROLLEY.

Application filed July 19, 1922. Serial No. 576,005.

*To all whom it may concern:*

Be it known that I, JOHN T. WELSH, a citizen of the United States, and a resident of Schenectady, in the county of Schenectady and State of New York, have invented a new and Improved Trolley, of which the following is a full, clear, and exact description.

This invention relates to improvements in trolleys and more particularly to trolleys for overhead electric wires, some of the objects of the invention being enumerated as follows:

1. To relieve the tendency of the trolley wheel to leave the trolley wire when curves, slack or irregularities in wire are encountered.

2. To decrease the impact between trolley wheel and wire under above conditions.

3. To decrease the operating pressure between trolley wheel and wire.

4. To increase the area of contact between trolley wheel and wire.

5. To achieve all the benefits which will accrue through the attainment of aforesaid objects.

With these and other objects in view, the invention consists in certain novel features of construction and combinations, and arrangement of parts, as will be more fully hereinafter described and pointed out in the claims.

In the accompanying drawings—

Figure 1 is a view in side elevation partly in broken section illustrating my improved trolley.

Figure 2 is a top plan view.

Figure 3 is a view in section on the line 3—3, of Figure 1.

1 represents a trolley pole and 2 a spring tip of tubular spring steel, or other suitable material, which is secured on the end of the pole 1 and supports at its free end a fork 3, the latter being secured in the outer or free end of the spring tip 2.

The fork 3 is provided in its members with concentrically curved bearings 4, 4. These bearings 4, 4, have longitudinal slots 5 therein to receive the axle 6 and permit a limited oscillatory movement of the axle and the trolley wheel 7 mounted thereon.

A pair of bearing blocks or shoes 8 are secured by pins 9 or other fastening devices to the axle 6, and interposed between the trolley wheel 7 and the bearings 4 so as to slide on the bearings and maintain the trolley wheel in proper relation to the fork yet permit the desired pivotal movement.

The function of the spring tip is to provide a spring of short period so that when an unevenness in the wire is encountered by the wheel, it will not be thrown off. The mass involved when the spring tip is flexed is small when compared to the present arrangement in which the vertical motion of the trolley wheel is transmitted to the coil spring at the base of the trolley pole; the impact is proportionate. When the unevenness encountered is of such magnitude that the trolley wheel is thrown down from the wire and the coil spring flexed, the difference in period between the coil and tip is such that when wheel and wire come in contact, the tip will be in position to absorb most of the shock.

The function of the oscillatory freedom provided trolley wheel is to enable it to follow the wire on curves and not climb. This allows the wheel groove to conform to the arc of a circle of radius equal to that of the trolley wire, thus giving line contact between wheel and wire and reducing electrical resistance.

The combination of above features allow the operating pressure between the trolley wheel and wire to be reduced.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

I claim:

1. A device of the character described, comprising a tubular spring metal tip adapted to be secured to a trolley pole, a fork secured in the outer end of the tubular spring tip, and a trolley wheel mounted in the fork and having oscillatory movement therein.

2. The combination with a trolley fork, of concentric bearings on the fork having longitudinal slots therein, an axle mounted in the slots, a trolley wheel on the axle, and bearing blocks or shoes fixed to the axle and having curved surfaces engaging the curved surfaces of the bearings whereby the trolley wheel is permitted a limited oscillatory movement.

3. The combination with a trolley pole, of a fork, a spring yieldable in all directions and connecting the fork with the pole, and a trolley wheel mounted in the fork to have oscillatory movement therein.

JOHN T. WELSH.